(12) United States Patent
Mihalache et al.

(10) Patent No.: US 12,539,764 B2
(45) Date of Patent: Feb. 3, 2026

(54) REGENERATIVE MULTICELL DRIVE SYSTEM WITH OVERLAP ANGLE IN FUNDAMENTAL FREQUENCY MODULATION

(71) Applicant: Innomotics GmbH, Nuremberg (DE)

(72) Inventors: Liviu Mihalache, Valencia, PA (US); Richard H. Osman, Pittsburgh, PA (US); Mukul Rastogi, Murrysville, PA (US)

(73) Assignee: Innomotics GmbH, Nuremberg (DE)

( * ) Notice: Subject to any disclaimer, the term of this patent is extended or adjusted under 35 U.S.C. 154(b) by 161 days.

(21) Appl. No.: 18/553,659

(22) PCT Filed: Apr. 7, 2021

(86) PCT No.: PCT/US2021/026088
§ 371 (c)(1),
(2) Date: Oct. 2, 2023

(87) PCT Pub. No.: WO2022/216279
PCT Pub. Date: Oct. 13, 2022

(65) Prior Publication Data
US 2024/0181892 A1    Jun. 6, 2024

(51) Int. Cl.
*H02P 3/14*    (2006.01)
*B60L 7/14*    (2006.01)
(Continued)

(52) U.S. Cl.
CPC ............. *B60L 7/14* (2013.01); *H02M 1/0077* (2021.05); *H02M 7/53871* (2013.01); *B60L 2210/40* (2013.01)

(58) Field of Classification Search
CPC ............... H02P 27/06; H02P 7/04; B60L 7/14
See application file for complete search history.

(56) References Cited

U.S. PATENT DOCUMENTS 7,508,147 B2    3/2009  Rastogi et al.
8,922,151 B2    12/2014 Yoo
(Continued)

FOREIGN PATENT DOCUMENTS

| DE | 102016115144 A1 | 2/2017 | |
| EP | 2582032 A2 | 4/2013 | |
| WO | WO-2006125184 A1 * | 11/2006 | ............ H02M 5/458 |

OTHER PUBLICATIONS

Rodriguez J. et al: "Topologies for regenerative cascaded multilevel inverters"; PESC'03. 2003 IEEE 34th. Annual Power Electronics Specialists Conference. Conference Proceedings. Acapulco, Mexico, Jun. 15-19, 2003; [Annual Power Electronics Specialists Conference], New York, NY; IEEE, US; vol. 2, Jun. 15, 2003 (Jun. 15, 2003), pp. 519-524, XP010648798.

*Primary Examiner* — Karen Masih
(74) *Attorney, Agent, or Firm* — Henry M. Felereisen LLC

(57) ABSTRACT

A regenerative drive system includes a plurality of power cells receiving power from a source and supplying power to one or more output phases, wherein each power cell is operable in multiple operation modes, each power cell including multiple switching devices including active front-end switching devices, and a central control system controlling operation of the plurality of power cells, wherein the central control system is configured to control the active front-end switching devices of each power cell with variable conduction angles in the multiple operation modes.

13 Claims, 15 Drawing Sheets

(51) Int. Cl.
*H02M 1/00* (2006.01)
*H02M 7/5387* (2007.01)

(56) References Cited

U.S. PATENT DOCUMENTS

| | | | |
|---|---|---|---|
| 9,887,645 | B2 | 2/2018 | Mizukami et al. |
| 2002/0085398 | A1 | 7/2002 | Bixel |
| 2009/0302682 | A1 | 12/2009 | Hammond et al. |

* cited by examiner

REGENERATIVE MULTICELL DRIVE SYSTEM WITH OVERLAP ANGLE IN FUNDAMENTAL FREQUENCY MODULATION

BACKGROUND

1. Field

Aspects of the present disclosure generally relate to a drive system, specifically to a regenerative drive system and a method for controlling a regenerative drive system. Such a drive system can be for example a medium voltage variable frequency drive. Throughout the specification, the terms "drive", "drive system", "multilevel power converter", "converter", "power supply" and "variable frequency drive (VFD)" can be used interchangeably.

2. Description of the Related Art

Medium voltage (MV) variable frequency drives, such as for example multilevel power converters, are used in applications of medium voltage alternating current (AC) drives, flexible AC transmission systems (FACTS), and High Voltage DC (HVDC) transmission systems, because single power semiconductor devices cannot handle high voltage. Multilevel power converters typically include a plurality of power cells for each phase, each power cell including an inverter circuit having semiconductor switches that can alter the voltage output of the individual cells. One example of a multilevel power converter is a cascaded H-bridge converter system having a plurality of H-bridge cells as described for example in U.S. Pat. No. 5,625,545 to Hammond, the content of which is herein incorporated by reference in its entirety.

Power converters receive three-phase power from an AC source and deliver output power to a load, e.g., a three-phase AC motor. This mode of operation is referred to as motoring mode. However, there are applications or scenarios when speed of the load, e.g. three-phase AC motor, needs to be reduced, and thus power from the motor needs to be absorbed by the drive system, specifically by the inverter circuits. This mode of operation is referred to as regeneration mode. An objective of the present disclosure is to provide a regenerative drive system and a method for controlling the regenerative drive system that meet certain input current harmonics limits during regeneration mode, for example set by IEEE-519 guideline.

SUMMARY

Briefly described, aspects of the present disclosure generally relate to a drive system, specifically to a regenerative drive system and a method for controlling a regenerative drive system.

A first aspect of the present disclosure provides a regenerative drive system comprising a plurality of power cells receiving power from a source and supplying power to one or more output phases, wherein each power cell is operable in multiple operation modes, each power cell comprising multiple switching devices including active front-end switching devices, and a central control system controlling operation of the plurality of power cells, wherein the central control system is configured to control the active front-end switching devices of each power cell with variable conduction angles in the multiple operation modes.

A second aspect of the present disclosure provides a method for controlling a regenerative drive system comprising determining conduction angles for active front-end switching devices of a plurality of power cells of a drive system for multiple operation modes and controlling the active front-end switching devices of the plurality of power cells with the conduction angles during the multiple operation modes, wherein the conduction angles vary depending on an operation mode.

A third aspect of the present disclosure provides a non-transitory computer readable medium encoded with processor executable instructions that when executed by at least one processor, cause the at least one processor to carry out a method for determining conduction angles of active front-end switching devices of a regenerative power cell as described herein.

BRIEF DESCRIPTION OF THE DRAWINGS

FIG. 7 and FIG. 8 illustrate graphical representations of a simulation of input currents of an individual RC during regeneration, wherein FIG. 7 illustrates input currents without angle advance and FIG. 8 illustrates input currents with an angle advance in accordance with exemplary embodiments of the present disclosure.

DETAILED DESCRIPTION

To facilitate an understanding of embodiments, principles, and features of the present disclosure, they are explained hereinafter with reference to implementation in illustrative embodiments. In particular, they are described in the context of being a drive system, in particular a medium voltage (MV) variable frequency drive including multi-cell power supplies such as modular multilevel converter systems and cascaded H-bridge converter systems. Embodiments of the present disclosure, however, are not limited to use in the described devices or methods.

As used herein, a "medium voltage" is a voltage of greater than about 690V and less than about 69 KV, and a "low voltage" is a voltage less than about 690V. Persons of ordinary skill in the art will understand that other voltage levels may be specified as "medium voltage" and "low voltage". For example, in some embodiments, a "medium voltage" may be a voltage between about 3 kV and about 69 kV, and a "low voltage" may be a voltage less than about 3 kV.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
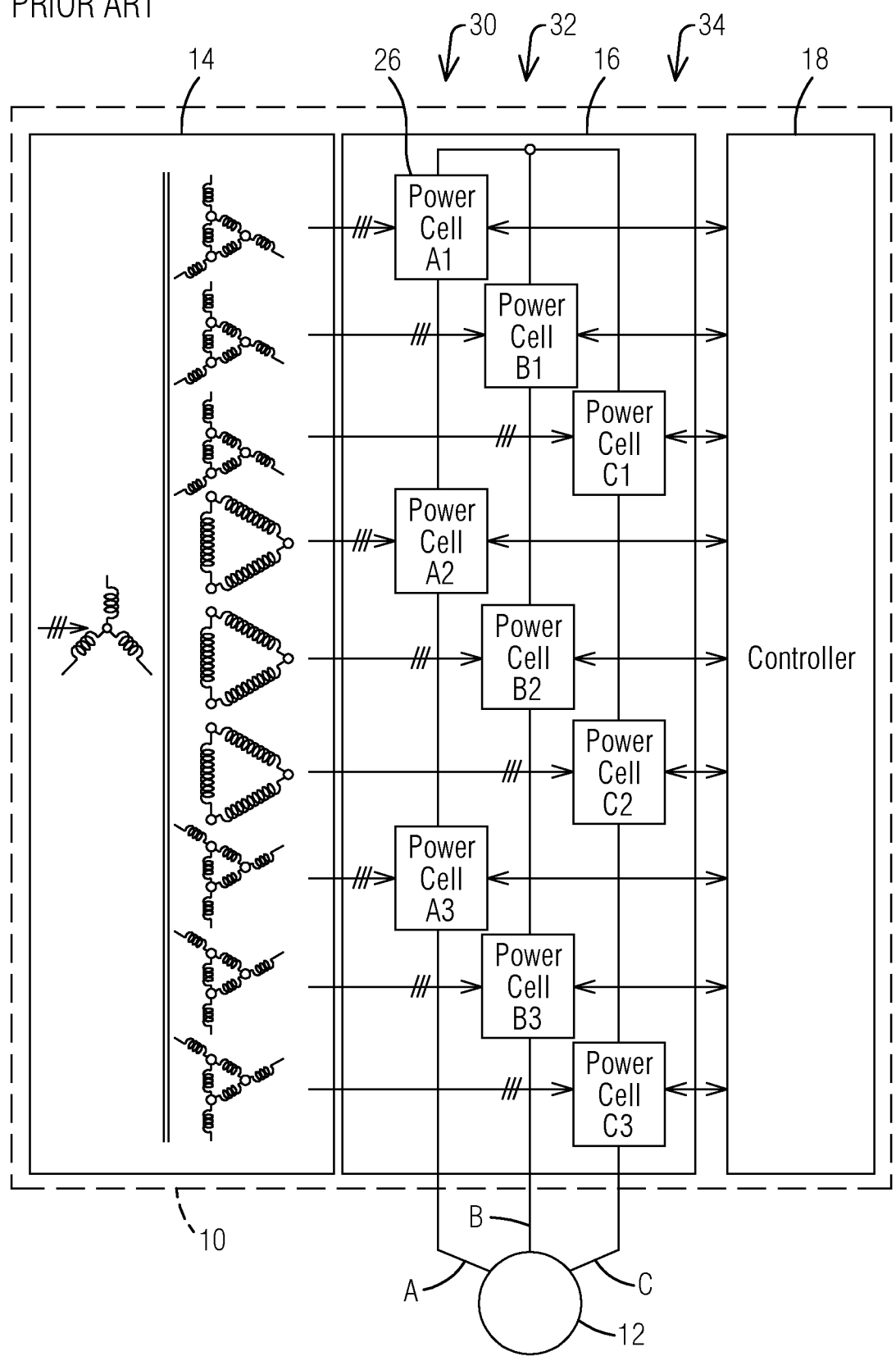
FIG. 1 illustrates a schematic diagram of a known basic configuration of a cascaded H-bridge converter system in accordance with an exemplary embodiment disclosed herein.

FIG. 1 illustrates a schematic of a known multi-cell power supply 10, specifically a cascaded H-bridge converter system that receives three-phase power from an alternating current (AC) source, and delivers power to a load 12, e.g., a three-phase AC motor. An example of a cascaded H-bridge multilevel converter 310 is the Perfect Harmony GH180 ® drive manufactured by Siemens Industry, Inc.

The load 12 may comprise an AC-type motor, for example, synchronous, asynchronous, permanent magnet, and may be rated for low voltage, medium voltage or high-voltage. For example, medium-voltage AC motors, such as those used in industrial process control, may operate in the 4.16 kV to 13.8 kV range. Greater or lesser voltage may be used. More than one motor may be connected. Other loads may be used instead of or in addition to the motor. The motor responds to voltage applied by the multi-cell power supply 10 on the three phases, for example, to increase, decrease or maintain a speed or position.

With reference to FIG. 1, the multi-cell power supply 10 includes a transformer 14, a power circuit 16, and a central control system 18, herein also referred to as controller. The transformer 14 includes a primary winding that excites nine secondary windings, and the power circuit 16 includes multiple printed circuit board (PCB) power cells 26, herein simply referred to as power cells 26 or as power modules, that are operably coupled to the secondary windings, respectively, of the transformer 14. As the power supply 10 comprises nine secondary windings, and a power cell 26 is operably coupled to each secondary winding, the power supply 10 comprises nine power cells 26. Of course, the power supply 10 can comprise more or less than nine power cells 26 and/or more or less than nine secondary windings depending on a type of the power supply 10 and/or a type of the load 12 coupled to the power supply 10.

The power cells 26 are configured to provide a medium voltage output to the load 12. Each output phase A, B, C of the power circuit 16 is fed by a group of series-connected power cells 26. Outputs of the power cells 26 are coupled in series in a first phase group 30, at second phase group 32, and a third phase group 34. Each phase output voltage is a sum of the output voltages of the power cells 26 in the respective phase group 30, 32 and 34. For example, the first phase group 30 comprises power cells 26 labelled A1, A2 and A3, wherein the phase output voltage of the output phase A is the sum of the output voltages of the power cells A1, A2 and A3. The same applies to output phase B and power cells B1, B2, B3, and output phase C and power cells C1, C2, C3. In this regard, the power circuit 16 delivers a medium voltage output to output load 12 using lower voltage rated power cells 26 that include components rated to lower voltage standards. Each power cell 26 is coupled, e.g., for example via an optical fiber communication link, to central control system 18, which may use current feedback and voltage feedback to control operation of the power cells 26.

It should be noted that in FIG. 1 the number of power cells 26, in each phase group 30, 32, 34 can be between 2 and 12 to provide different (medium voltage) outputs as required by the load 12. As noted in the embodiment of FIG. 1, the number of secondary windings of transformer 14 matches the number of power cells 26. It will be appreciated by those of ordinary skill in the art that other cell counts, and diode bridge counts may be used depending upon the application and that the configurations shown and described herein are intended to be exemplary in natures.

Figure 2:
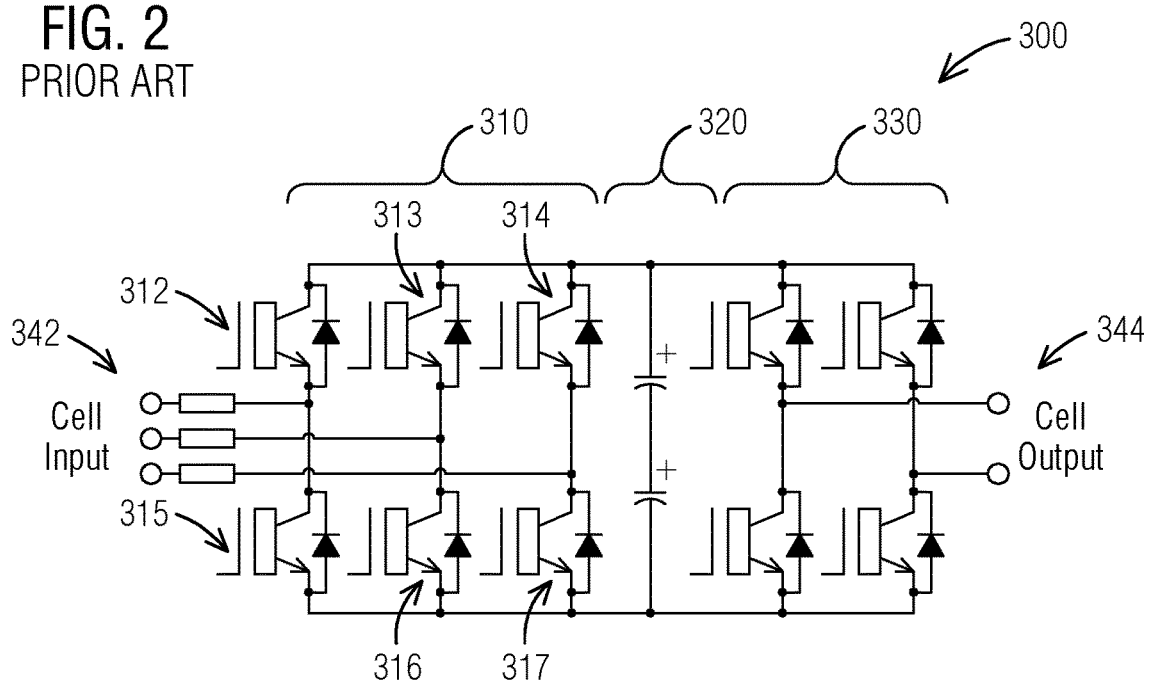
FIG. 2 illustrates a schematic diagram of a known power cell with regenerative capacity in accordance with an aspect of the present disclosure.

FIG. 2 illustrates a schematic diagram of a known power cell 300 with regenerative capacity in accordance with an aspect of the present disclosure. As mentioned above, there are applications or scenarios when speed of the load 12 (see FIG. 1), e.g. three-phase AC motor, needs to be reduced, and thus power from the motor needs to be absorbed by the drive system, specifically by the inverter circuits, which is known as regeneration mode or as braking mode.

A power cell that allows power to be absorbed from the load is herein also referred to as a regenerative cell (RC). Although an example of an RC is shown in FIG. 2, other RCs may be used in the embodiments described herein.

With reference to FIG. 2, regenerative cell 300 includes an active front end 310 that serves as a three-phase bridge as it receives power from dedicated three-phase secondary windings of the transformer via an input 342. The cell 300 also includes a plurality of current controlling devices such as transistors or thyristors 312-317, for example insulated gate bipolar transistors (IGBTs), integrated gate commuted thyristors or other devices, generally referred to herein as the front-end transistors. Although six transistors in a bridge format—in this example, three pairs of two transistors each connected in parallel across the DC terminals are illustrated in FIG. 2, other numbers of transistors may be used. The transistors 312-317 can be controlled by a local or central (for example remote) control system (see for example controller 18 in FIG. 1) to transfer energy in either direction thus allowing motoring mode or regeneration mode to full capacity (i.e., approximately, or fully 100%). The power cell 300 further includes one or more capacitors 320 and an H-bridge inverter 330, each connected across the output or DC terminals of the active front end 310, to deliver AC power to the output 344. Other inverter bridges may be used as substitutes for the four-transistor H-bridge 330 illustrated in FIG. 2. For example, an H-bridge comprising eight transistors based on the neutral-point clamped connection may be used.

Figure 3:
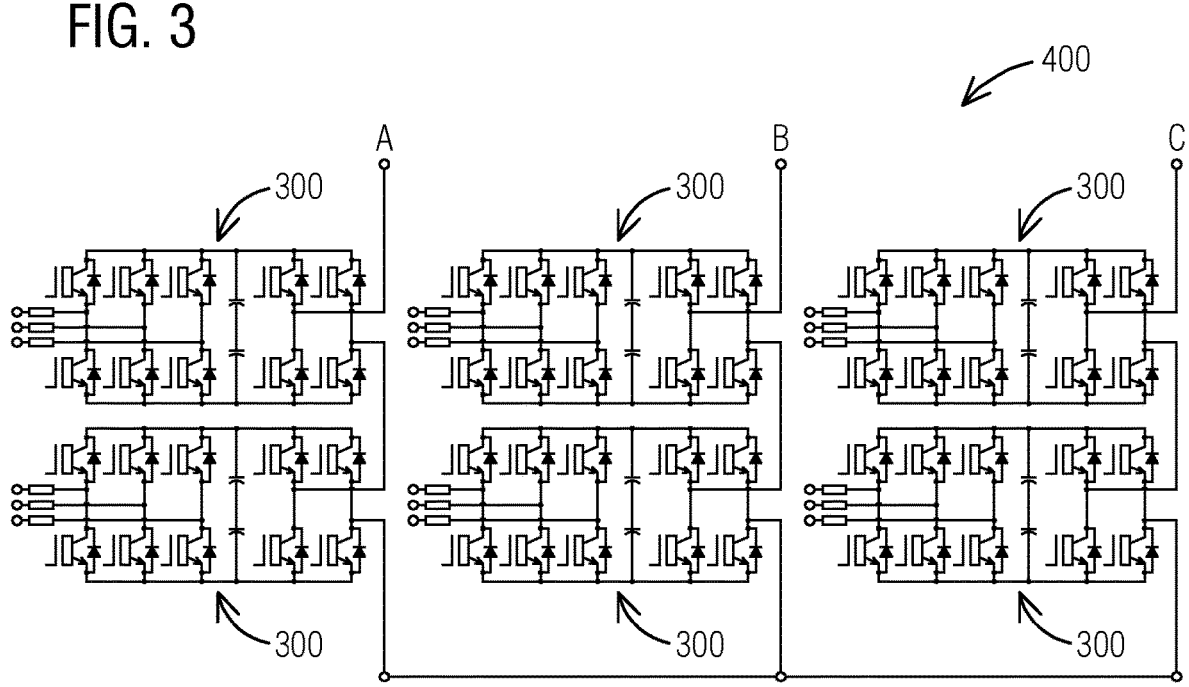
FIG. 3 illustrates a schematic diagram of an arrangement of multiple power cells with regenerative capacity in accordance with an exemplary embodiment of the present disclosure.

FIG. 3 illustrates a schematic diagram of an arrangement 400 of multiple power cells with regenerative capacity in accordance with an exemplary embodiment of the present disclosure.

In an example, the arrangement 400 of FIG. 3 illustrates six regenerative power cells 300, connected in series for each phase A, B and C, wherein the regenerative power cells 300 can be configured as described with reference to FIG. 2. Although FIG. 3 illustrates six power cells 300, it should be noted that arrangements may comprise more than six regenerative power cells 300, for example nine or twelve regenerative power cells 300. For example, and referring to FIG. 1, all the power cells of the drive system 10 can be RCs as described for example with reference to FIG. 2.

The present disclosure provides a regenerative drive system, such as for example regenerative arrangement 400 as illustrated in FIG. 3, and a method for controlling the regenerative drive system, specifically controlling the active front end 310 comprising front-end transistors (IGBT's) 312-317 in a three-phase regenerative cell 300. In an exemplary embodiment of the present disclosure, the regenerative drive system 400 comprising a plurality of power cells 300 receiving power from a source and supplying power to one or more output phases, wherein each power cell 300 is operable in multiple operation modes, each power cell 300 comprising multiple switching devices including active front-end switching devices, and a central control system (see for example controller 18 of FIG. 1) controlling operation of the plurality of power cells 300, wherein the central control system is configured to control the active front-end switching devices of each power cell 300 with variable conduction angles in the multiple operation modes.

Typically, control methods for three-phase regenerative inverters (active front-end) use 120 degrees fixed conduction angle or some form of PWM control which require additional components (inductors). The method using fixed 120 degrees conduction angles introduces significant harmonics and it is only viable in a medium voltage drive with a high number of cells. A PWM control method can achieve low harmonic content however it implies additional costs due to the need for additional inductance.

When a standard six steps control method is used, conduction angles of the front-end IGBT's 312-317 are set and fixed to 120 degrees, i.e. conduction angles of the IGBT's 312-317 during the regeneration mode are mirroring conduction angles of rectifier diodes during motoring mode. In this case, a cascaded H-bridge topology with low cell count (9 power cells or less) cannot meet the requirements of IEEE-519 guideline with regards to the input current distortion.

To meet the requirements of the IEEE-519 guideline with respect to the input current distortion, an improved six steps control method is provided herein. Different from the standard method where the conduction angle is set fixed at 120 degrees, the improved method varies the conduction angles of the front-end IGBT's 312-317, based on output current and impedance of the respective power cell. The method can be applied with or without input current sensors and, if current sensors are available, an input impedance can be estimated and utilized to adjust the conduction angles. In another embodiment, if the impedance is known (through measurements or simulations) it can be directly entered as a parameter. By using the control method described herein, a drive system with 9 or less regenerative power cells 300 achieves a total harmonic distortion, herein simply referred to as THD, of less than 5%, thus meeting the IEEE-519 standard limits.

Conduction angle as used herein refers to the angle in which the front-end IGBT's conduct. Variable conduction angle as used herein comprises for example an (phase) angle advance in combination with the nominal conduction angle which is 120 degrees. In an example, the angle advance varies, wherein the nominal conduction angle is fixed. For example, switching devices of the power cells of the drive system may comprise a fixed nominal conduction angle of 120 degrees in the motoring mode, and comprise an angle advance of 17 degrees in addition to the nominal conduction angle of 120 degrees in the regeneration mode.

Figure 4:
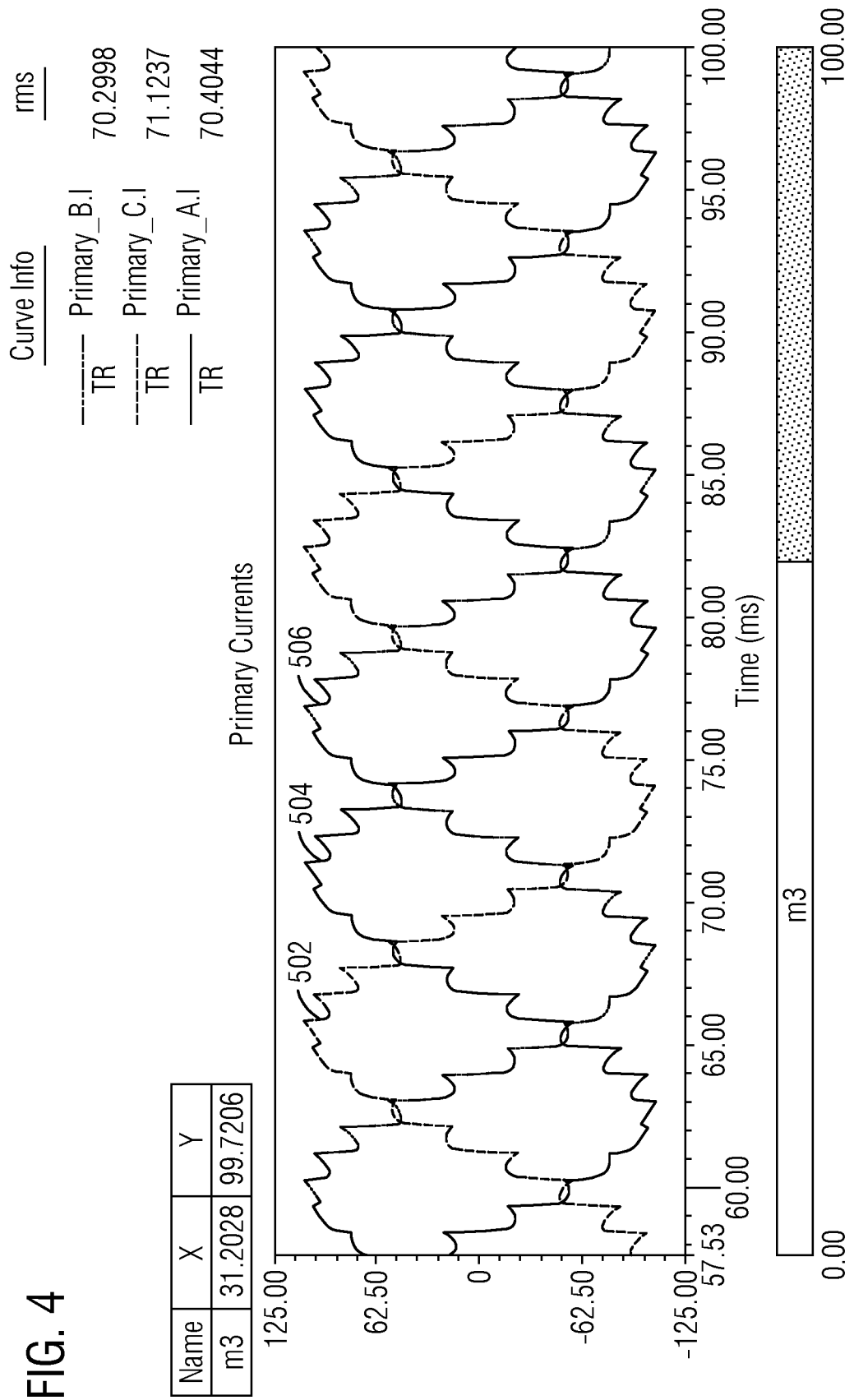
FIG. 4 illustrates a graphical representation of a simulation of resulting primary currents of a drive system with no angle control.
Figure 5:
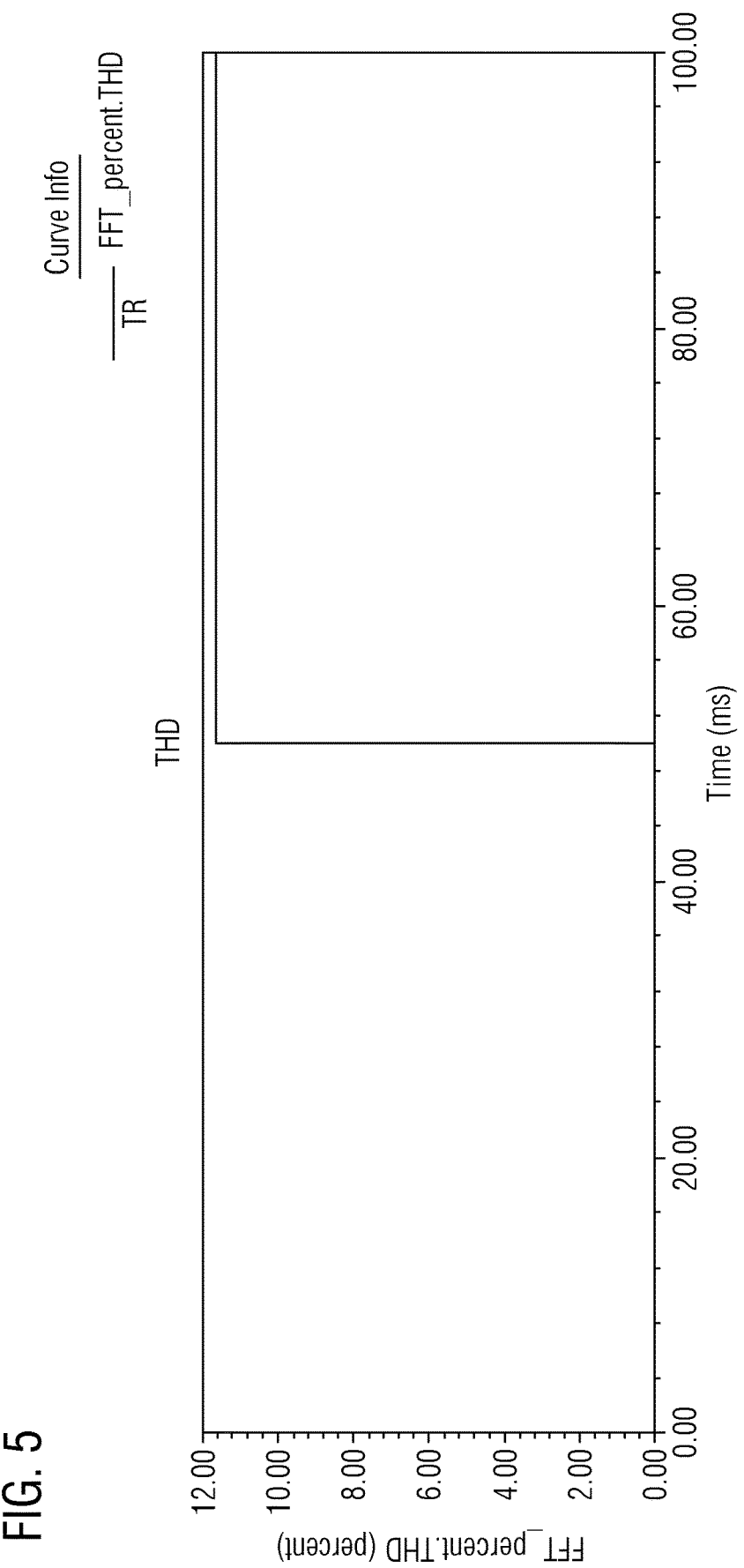
FIG. 5 illustrates THD for the primary currents shown in FIG. 4, in accordance with exemplary embodiments of the present disclosure.

FIG. 4 illustrates a graphical representation of a simulation of resulting primary currents of a drive system, and FIG. 5 illustrates THD for the primary currents shown in FIG. 4, in accordance with exemplary embodiments of the present disclosure.

A drive system with nine (9) RCs arranged in a cascaded H-bridge drive topology and equipped with a standard 18-pulse transformer does not meet the IEEE-519 guideline with respect to THD limits during regeneration mode, if the RCs are operated in a six-steps mode, i.e. with conduction angles of the rectifier diodes equal to those used in a motoring mode of the drive.

FIG. 4 depicts a simulation for an 18 pulse-based drive system including primary currents 502, 504, 506 for each phase of the 3-phase AC drive system. Even though cell operation was simplified and reduced to that of a constant current source, thus eliminating strong effect of the second harmonic normally present on the DC-link current, the resulting primary current present significant distortion. As can be seen in FIG. 5, the THD of the primary currents is close to 12%, well above the 5% limit set by the IEEE-519 standard. Cell currents of an individual RC need to be examined to understand reason(s) for the THD.

Figure 6:
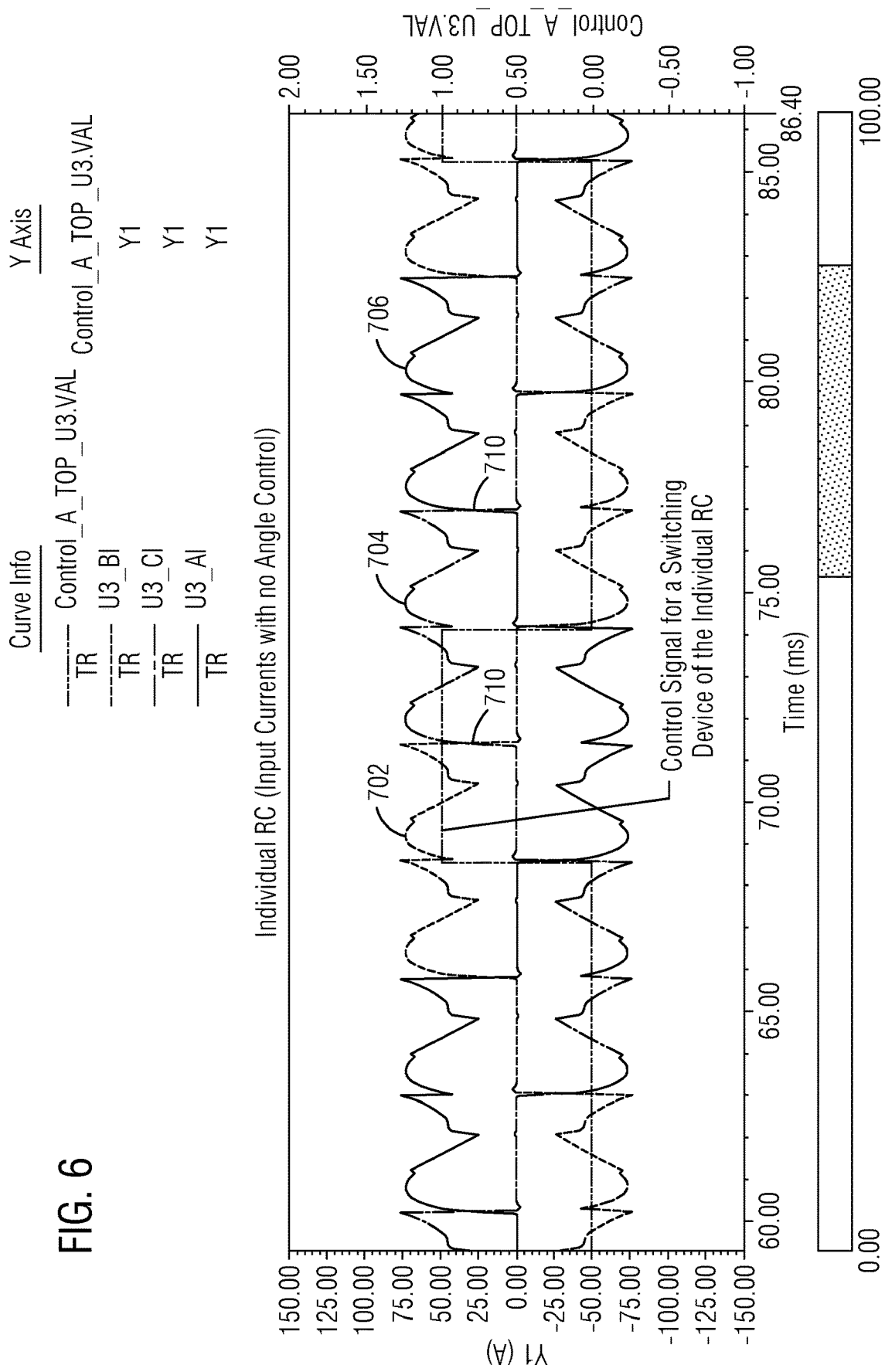
FIG. 6 illustrates a graphical representation of a simulation of input current waveforms for an individual RC-along with the control signal for an active front-end switching device during regeneration in accordance with an exemplary embodiment of the present disclosure.

FIG. 6 illustrates a graphical representation of a simulation of input current waveforms for an individual RC along with an active-front end switching device during regeneration in accordance with an exemplary embodiment of the present disclosure.

FIG. 6 illustrates that commutations of the active-front end of an individual RC, such as active front-end 310 of power cell 300, create sharp, step changes 710 of input currents 702, 704, 706, because the input currents 702, 704, 706 are forced to conduct only when the front-end switching devices, e.g. IGBTs, are turned on. Further, there is a significant oscillating current component during operation. Because the input bridge—formed by three pairs of two IGBTs each connected in parallel across DC terminals—is now bidirectional, a DC-link current component is forced by the LC circuit since a path exists through the IGBTs or its FWD, independent of the cell load current and even if there is no load current.

For example, when there is no load connected to any RCs 300, the DC-link current is purely AC, oscillating at 6 times the input frequency which is consequently reflected on the input currents of the RCs as well. This is in stark contrast with the waveforms of a standard rectifier with capacitor filtering where the DC-link current can only have a unidirectional flow through the rectifier diodes, when the rectified voltage is higher than the capacitor voltage. The steps and oscillations present on the input currents of the RCs are naturally reflected on the input current of the drive system as shown in FIG. 4, thus leading to a high distortion content.

In an exemplary embodiment, input currents of the RCs during regeneration mode may be made to mirror their waveforms during motoring mode if the turn on and turn off angles (conduction angles) are adjusted from the standard 120 degrees conduction interval in the middle of a voltage sinewave.

With respect to a unidirectional diode bridge, it is known that current does not switch instantaneously from one diode to another. Instead, there is an overlapping angle where two diodes in the upper side or two diodes in the lower side can conduct. A length of such an overlapping angle depends on a DC-link current being commutated and line impedance. A formula for calculating an overlapping angle is expressed as provided in (1)

$$\cos(u) = 1 - \frac{2 \cdot \omega \cdot L \cdot I_{DC}}{V_{LL-PK}} \quad (1)$$

The principle can be used for operation in regeneration mode, where instead of firing the angles at the 120 degrees ideal angles, the turn on time can be advanced based on formula (1) thus forcing two IGBT's in the upper side or two IGBT's on the lower side to conduct at the same time. This approach would mimic diode commutation operation and eliminate the steps of the current waveforms of FIG. 6 (see ref numeral 710) and reflected in FIG. 4.

Figure 7:
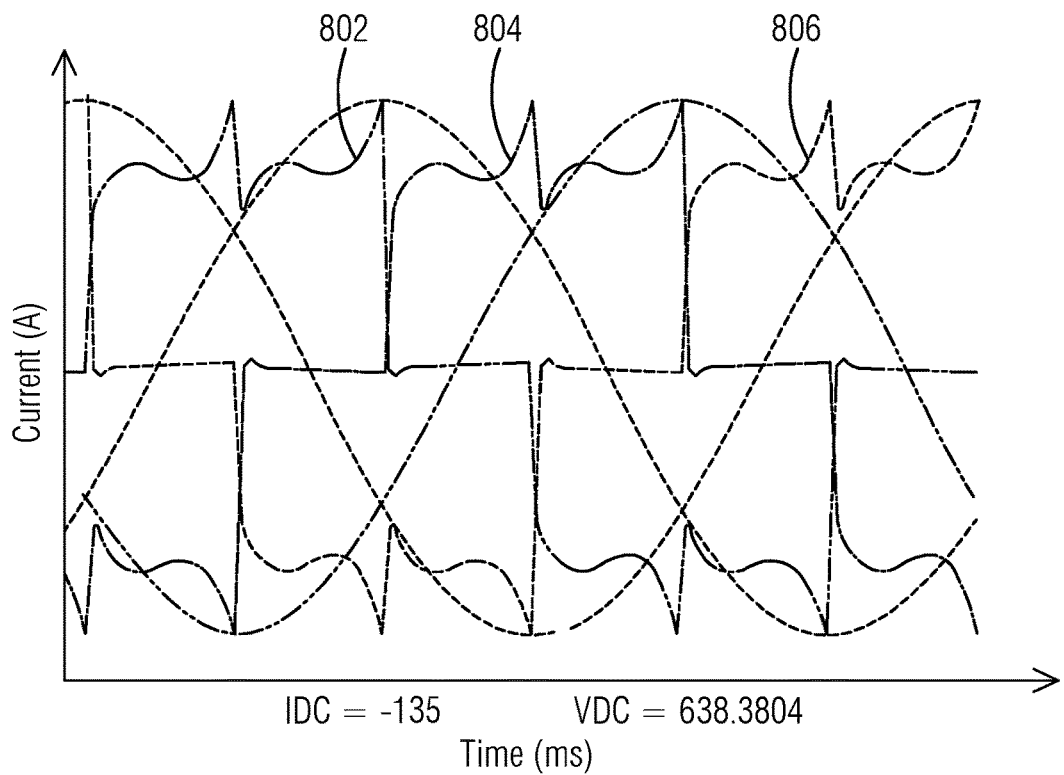
Figure 8:
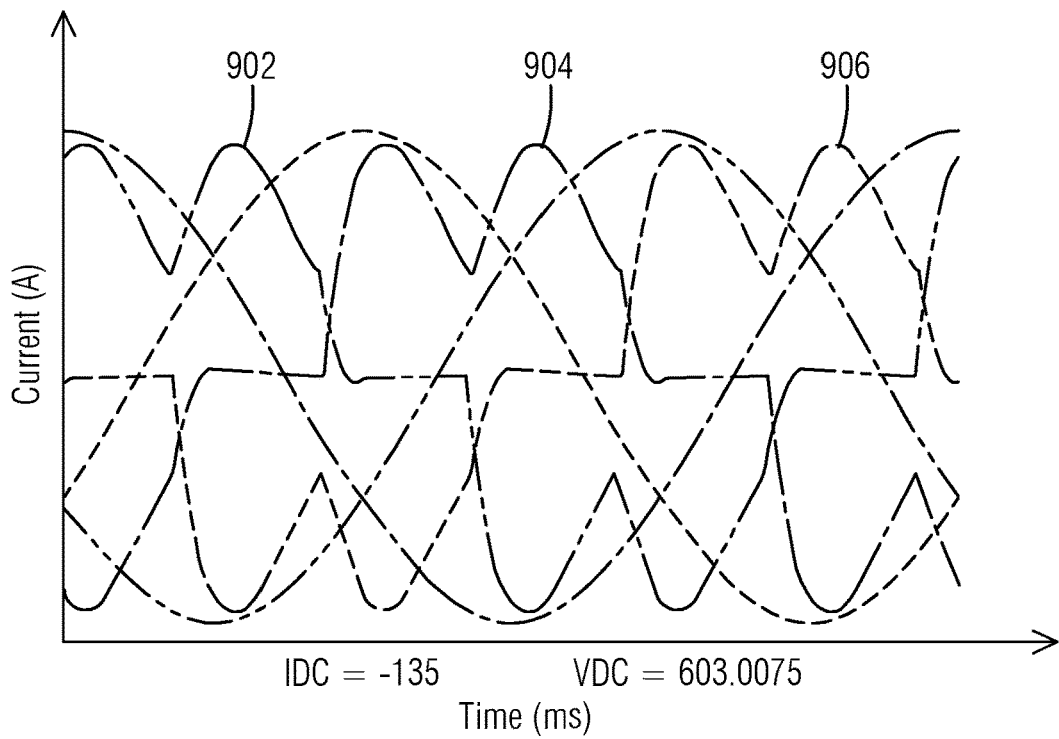

FIG. 7 and FIG. 8 illustrate graphical representations of a simulation of input currents of an individual RC during regeneration, wherein FIG. 7 illustrates input currents 802, 804, 806 without angle advance and FIG. 8 illustrates input currents 902, 904, 906 with an angle advance of 17 degrees in accordance with exemplary embodiments of the present disclosure. Angle advance relates to an adjusted or adapted conduction angle of the active front-end switching devices of an RC in regeneration mode. For example, switching devices of the RCs of the drive system may comprise a fixed nominal conduction angle of 120 degrees in the motoring mode, and comprise an angle advance of 17 degrees in addition to the nominal conduction angle of 120 degrees in the regeneration mode.

To verify that formula (1) may be used for RCs in regeneration mode, input currents of a single stand-alone RC are simulated and shown in FIG. 7 and FIG. 8. Parameters of the simulation are as follows: source voltage is 375 volts [V] to neutral peak (460 volts RMS line-to-line) at 60 hertz [HZ]. AC source reactance is 300 microhenries [μH] per phase (5%); DC-link capacitance is 6000 microfarads [μF]; and load is a DC current source in parallel with DC-link capacitors. It should be noted that for operation of the RC in regeneration mode, "$I_{DC}$" in formula (1) is the absolute value of the DC current. Further, it is important to note that formula (1) applies for a perfect DC-link current. In our case, even though a DC current source is assumed as load, the DC-link current, i.e. the current between IGBTs and capacitors (see FIG. 2), is not DC but contains a significant AC component.

Figure 9:
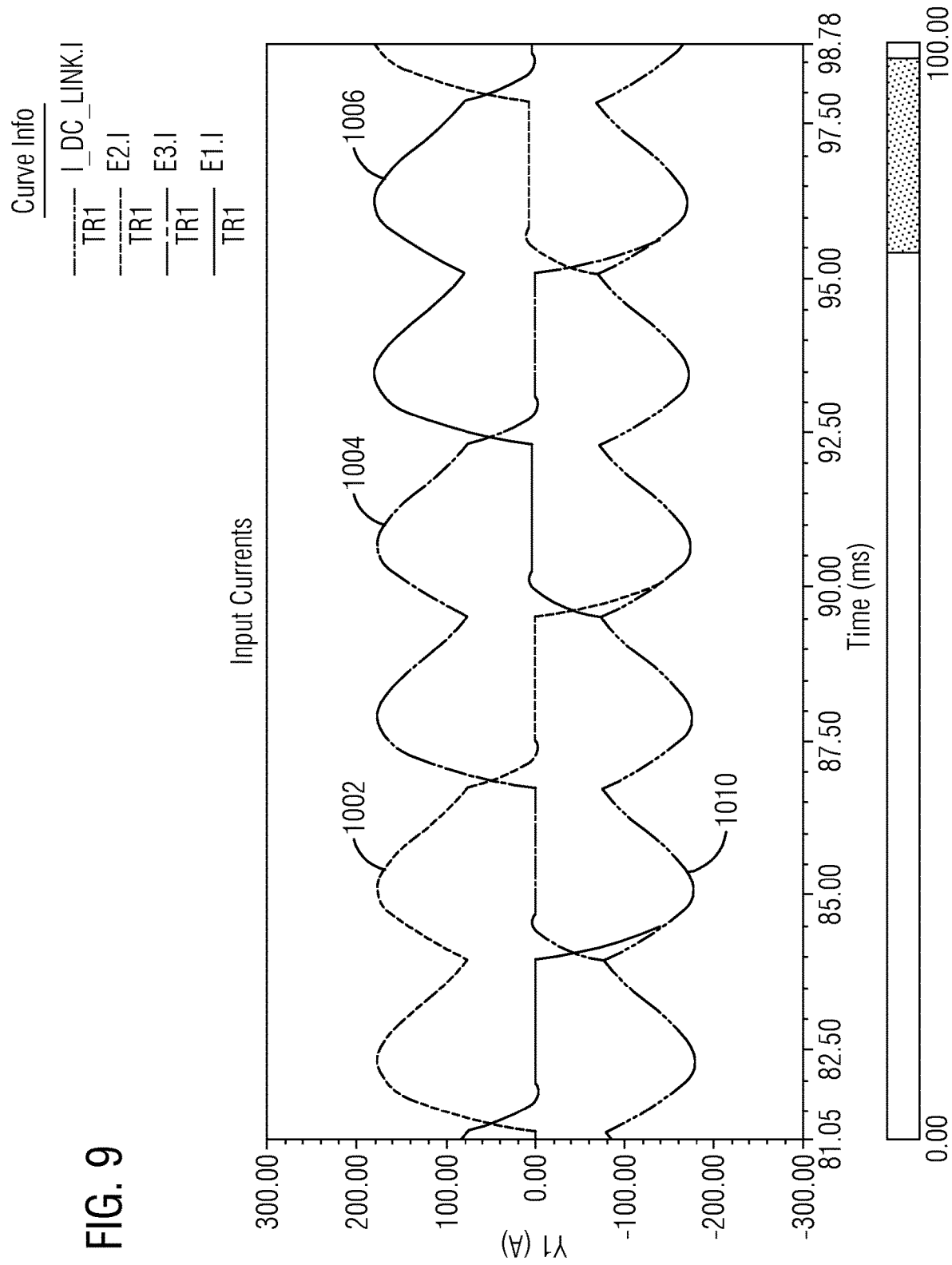
FIG. 9 illustrates a graphical representation of a simulation of input currents of an individual RC during regeneration, including DC link current, in accordance with an exemplary embodiment of the present disclosure.

FIG. 9 illustrates a graphical representation of a simulation of input currents of an individual RC during regeneration, including DC link current, in accordance with an exemplary embodiment of the present disclosure.

FIG. 9 illustrates input currents 1002, 1004 and 1006 for each phase of the 3-phase RC, with an advance angle of 17 degrees, and DC link current 1010. FIG. 9 generally corresponds to FIG. 8, but the DC link current 1010 is added in FIG. 9.

Utilizing the simulation of FIG. 9, formula (1) can be replaced by formula (2), wherein $I_1$ and $I_2$ are beginning and end of the DC-link current values during commutation:

$$\cos(u) = 1 - \frac{\omega \cdot L \cdot (I_1 + I_2)}{V_{LL-PK}} \quad (2)$$

Formula (2) is developed assuming a linear change of the DC-link current during commutation, but the formula (2) is also correct for a quadratic change of the DC-link current during commutation. While formula (2) is an exact formula, it requires knowledge of $I_1$ and $I_2$. However, for large enough values of the DC-link capacitor, formula (2) can be approximated by formula (3), wherein k is a factor between 0 and 1 which accounts for current ripple in the DC-link current. The higher the line inductance L is, the closer k is to unity.

$$\cos(u) = 1 - \frac{2 \cdot \omega \cdot L \cdot k \cdot I_{DC}}{V_{LL-PK}} = 1 - \frac{2 \cdot \omega \cdot L_S \cdot I_{DC}}{V_{LL-PK}} \quad (3)$$

Figure 10:
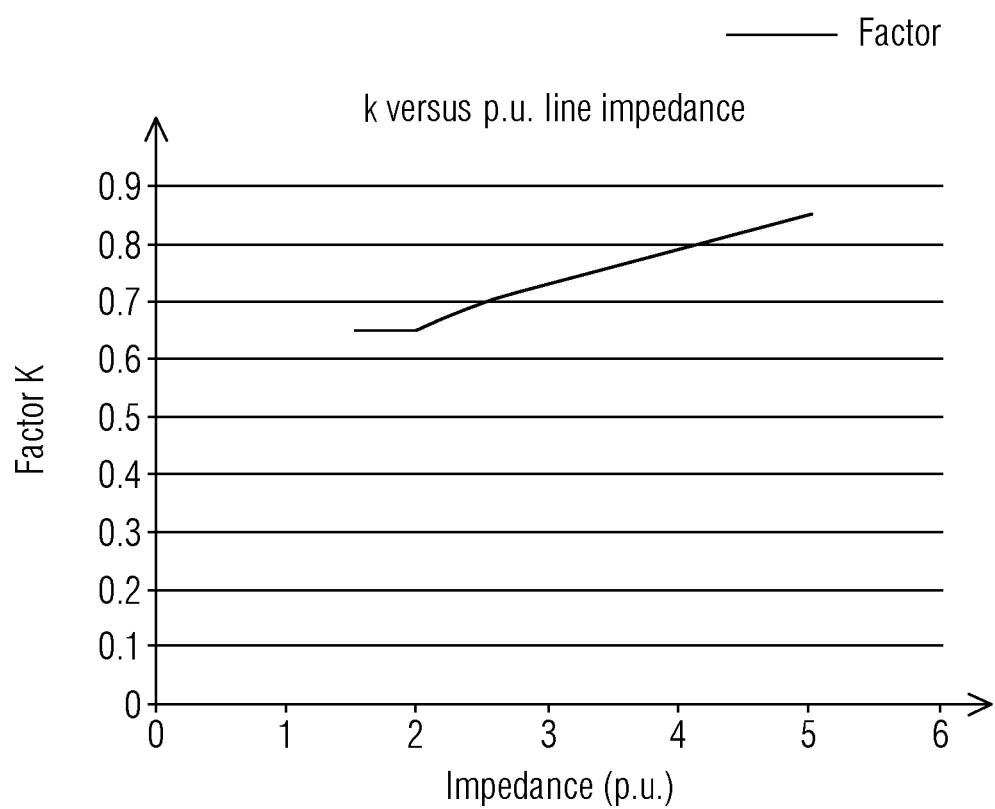
FIG. 10 illustrates a graphical representation of factor k in accordance with an exemplary embodiment of the present disclosure.

FIG. 10 illustrates a graphical representation of factor k of formula (3) in accordance with an exemplary embodiment of the present disclosure. Values of k are shown as a function of line impedance L (per unit) for values between 1.5% and 5% of THD.

Figure 11:
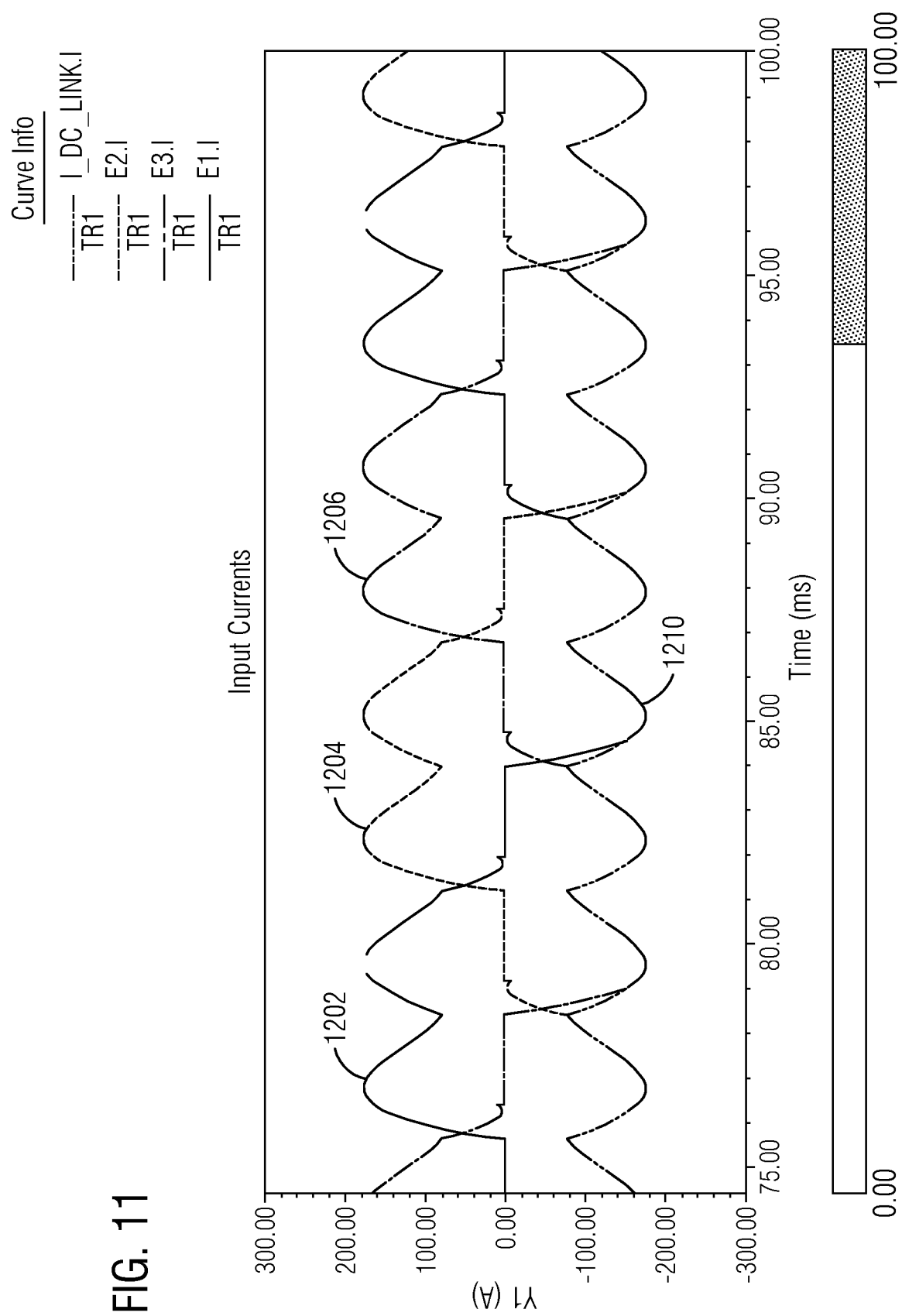
FIG. 11 illustrates a graphical representation of a simulation of input currents of an individual RC during regeneration, including advance angle and DC-link current, in accordance with an exemplary embodiment of the present disclosure.

FIG. 11 illustrates a graphical representation of a simulation of input currents of an individual RC during regeneration, including advance angle and DC-link current, in accordance with an exemplary embodiment of the present disclosure. FIG. 11 illustrates input currents 1202, 1204 and 1206 for each phase of the 3-phase RC, and DC-link current 1210.

Formula (3) is used to generate an advance angle for the six steps control method of the RC. As FIG. 11 shows, the waveforms shown in FIG. 9 and FIG. 11 match very well. FIG. 9 includes an advance angle of 17 degrees, while the advance angle provided by formula (3) is 16.7 degrees. Notably, even without the correction factor k (if we were to apply formula (1) directly), the advance angle would be 18.6 degrees, which is also close to the 17 degrees angles chosen in FIG. 9.

Formula (3) may be further simplified. For angles less than 20 degrees, which is typically the case, a quadratic approximation such as formula (4) may be used without significant errors.

$$\cos(\alpha) = 1 - \frac{\alpha^2}{2} \quad (4)$$

Further, the advance angle may be expressed using formulas (5) and (6), wherein $I_{DC}$ is the DC value of the DC-link current.

$$u = \sqrt{-2 \cdot x}, \text{wherein} \quad (5)$$

-continued $$x = \frac{2 \cdot \omega \cdot L_S \cdot I_{DC}}{V_{LL-PK}} \quad (6)$$

It should be noted that the negative sign in formula (5) is considering regeneration mode, where $I_{DC}$ has a negative sign.

With respect to a power balance of the RC, $I_{DC}$ may be expressed as provided in formula (7):

$$I_{DC} = \frac{V_{Cell\ out} \cdot I_{Cell\ out} \cdot \cos(\varphi)}{\rho \cdot V_{DC}} \quad (7)$$

With reference to formula (7), φ is load angle and p is cell efficiency, typically 98.5-99%. $V_{Cell\ out}$ is cell output voltage and $I_{Cell\ out}$ is cell output current, which corresponds to output current of the drive system. With reference to formula (6), parameter $L_S$ still needs to be determined.

So far, the provided analysis is limited to a single stand-alone RC, wherein the cell line impedance is clear and well defined. However, when using formula (3) in a drive system with nine (or more) RCs, cell impedances need to be determined, because there are strong couplings between the RCs, especially between adjacent RCs. From a physical point of view, a correct equivalent circuit may be self-inductance of each winding in series with a number of voltage sources due to each mutual coupling to the other windings. However, the model is far too complex to be practical; therefore, it needs to be simplified. One option is to use secondary-secondary impedances, i.e. the impedance seen by one secondary when all other secondaries and the primary are shorted. Extensive simulations have shown that while this option works, it does not seem to give optimum results, and tweaking the angles is still required to get the lowest THD. In addition, even if the RC has current sensors, determining the secondary-secondary impedance would be difficult to implement as an online method, rather, it may have to be determined through simulations for each transformer, or through off-line measurements.

Figure 12:
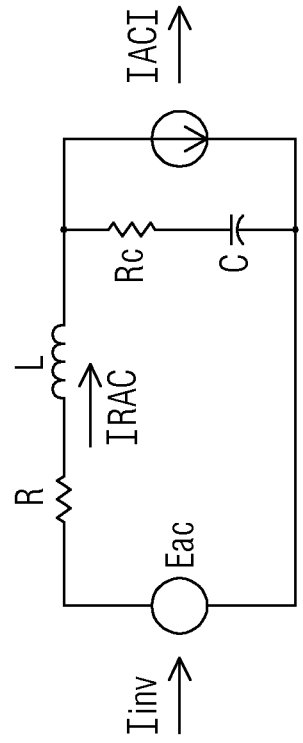
FIG. 12 illustrates a diagram of an equivalent circuit of a six-steps rectifier.
Figure 13:
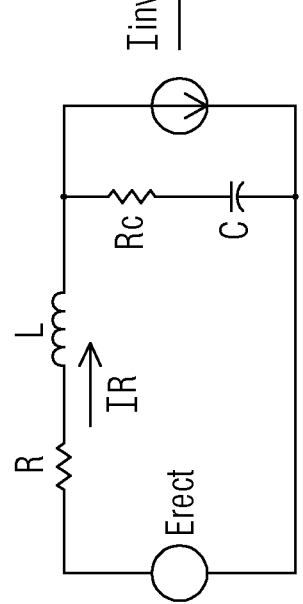
FIG. 13 illustrates a diagram of an AC only equivalent circuit of a six-steps rectifier, in accordance with exemplary embodiments of the present disclosure.

FIG. 12 illustrates a diagram of an equivalent circuit of a six-steps rectifier, and FIG. 13 illustrates a diagram of an AC only equivalent circuit of a six-steps rectifier, in accordance with exemplary embodiments of the present disclosure.

A method for obtaining a value of the impedance $L_S$ can be devised by taking advantage of a six-steps operation of an input IGBT three-phase bridge. A stand-alone six-step rectifier can be represented by the equivalent circuit as shown in FIG. 12, wherein $E_{rect}$ is unfiltered rectified voltage, and Ln, is the load due to the H-bridge. If only the AC part is considered, the equivalent circuit is shown in FIG. 13. When the H-bridge is turned off, the equivalent circuit is an LC circuit excited by the AC voltage ripple. It should be noted that L in FIG. 12 and FIG. 13 equals two times the input phase inductance, because there are two inductances in series during the six-step conduction. Moreover, given a relatively large capacitor value and high frequency of the AC source (6 times the line frequency), capacitor impedance may be neglected which means that a simple circuit is provided, comprising an AC voltage source due to the unfiltered ripple and an inductor. Based on the voltage, current is measured, and inductance calculated. An expression for the ripple $E_{ac}$ is provided by formula (8):

$$E_{ac} = \sum_{n=0,12,...} \frac{6 \cdot \sqrt{3}}{\pi} \cdot \frac{(-1)^{p+1}}{n^2 - 1} \cdot [\cos(n \cdot \theta_s)] = \sum_{n=0,12,...} R_s \cdot [\cos(n \cdot \theta_s)] \quad (8)$$

Further, the first harmonic is important with respect to THD and is six times the line frequency and is provided by formulas (9) and (10):

$$E_{AC} = 0.094 \cdot V_{LN-PK} \cdot \cos(\omega_6 \cdot t), \text{ wherein} \quad (9)$$

$$\omega_6 = 6 \cdot 2 \cdot \pi \cdot f_{line} \quad (10)$$

Once the current is measured through inductance, the value for $L_S$ can be determined by formula (11):

$$L_S = \frac{0.094 \cdot V_{LN-PK}}{2 \cdot \omega_6 \cdot I_{MEAS\_PK}} \quad (11)$$

Further, to verify formula (11), a simulation test may be performed, wherein each RC is operated without load and all remaining RCs completely stopped, that is, both the six-steps active front end and the H-bridge are turned off. Thus, each RC is run as a stand-alone cell without load and no couplings from adjacent cells. Peak current is measured on the cell input and formula (11) is used to measure the inductance $L_S$. Results of the simulation test are provided in Table 1 below, second column:

TABLE 1

| Cell | Inductance measured by analytic formula (11) (p.u) | Inductance measured through standard current injection method (p.u.) |
|---|---|---|
| Phase U-RC U1 | 5.8 | 5.92 |
| Phase U-RC U2 | 4.31 | 4.44 |
| Phase U-RC U3 | 3.64 | 3.62 |
| Phase V-RC V1 | 3.0 | 3.03 |
| Phase V-RC V2 | 2.76 | 2.82 |
| Phase V-RC V3 | 3.01 | 3.06 |
| Phase W-RC W1 | 3.44 | 3.59 |
| Phase W-RC W2 | 4.29 | 4.43 |
| Phase W-RC W3 | 5.82 | 5.94 |

The values of the second column are compared with a standard test where rated current is injected in each secondary transformer winding with all other secondary windings open and the primary shorted. The results are shown in the third column of Table 1 and it can be seen that there is a very good match between the two methods, which validates the use of formula (11).

Further, after verifying formula (11), all RCs are simultaneously operated in six-steps control method without load (H-bridges turned off on all cells), and formula (11) is again applied to determine each cell inductance. Results are shown in Table 2 below:

TABLE 2

| Cell | Inductance $L_S$ (p.u) |
|---|---|
| Phase U-RC U1 | 2.21 |
| Phase U-RC U2 | 1.62 |
| Phase U-RC U3 | 1.44 |
| Phase V-RC V1 | 1.31 |

TABLE 2-continued

| Cell | Inductance $L_S$ (p.u) |
|---|---|
| Phase V-RC V2 | 1.41 |
| Phase V-RC V3 | 1.36 |
| Phase W-RC W1 | 1.28 |
| Phase W-RC W2 | 1.71 |
| Phase W-RC W3 | 2.87 |

The values of Table 2 are used for calculating the advance angle with formulas (5)-(7), without further alterations. For comparison, values of the secondary-secondary impedances are shown in Table 3, wherein for certain cells the differences are significant:

TABLE 3

| Cell | Magnitude (p.u.) | Angle (deg) | R (p.u.) | X (p.u.) |
|---|---|---|---|---|
| Phase U-RC U1 | 3.28 | 75.25 | 0.835094 | 3.171911 |
| Phase U-RC U2 | 2.04 | 69.27 | 0.722088 | 1.907928 |
| Phase U-RC U3 | 2.1 | 70.97 | 0.684733 | 1.985231 |
| Phase V-RC V1 | 2.08 | 70.83 | 0.683014 | 1.964661 |
| Phase V-RC V2 | 2.01 | 70.67 | 0.665327 | 1.896692 |
| Phase V-RC V3 | 2.1 | 71.59 | 0.663211 | 1.992524 |
| Phase W-RC W1 | 2.08 | 70.42 | 0.697055 | 1.959723 |
| Phase W-RC W2 | 2.03 | 68.71 | 0.73707 | 1.891462 |
| Phase W-RC W3 | 3.28 | 75.21 | 0.837309 | 3.171327 |

Table 3 shows that if the secondary-secondary impedances are used, virtually no difference exists between U1 and W3 and very little difference between all other remaining cells.

Figure 14:
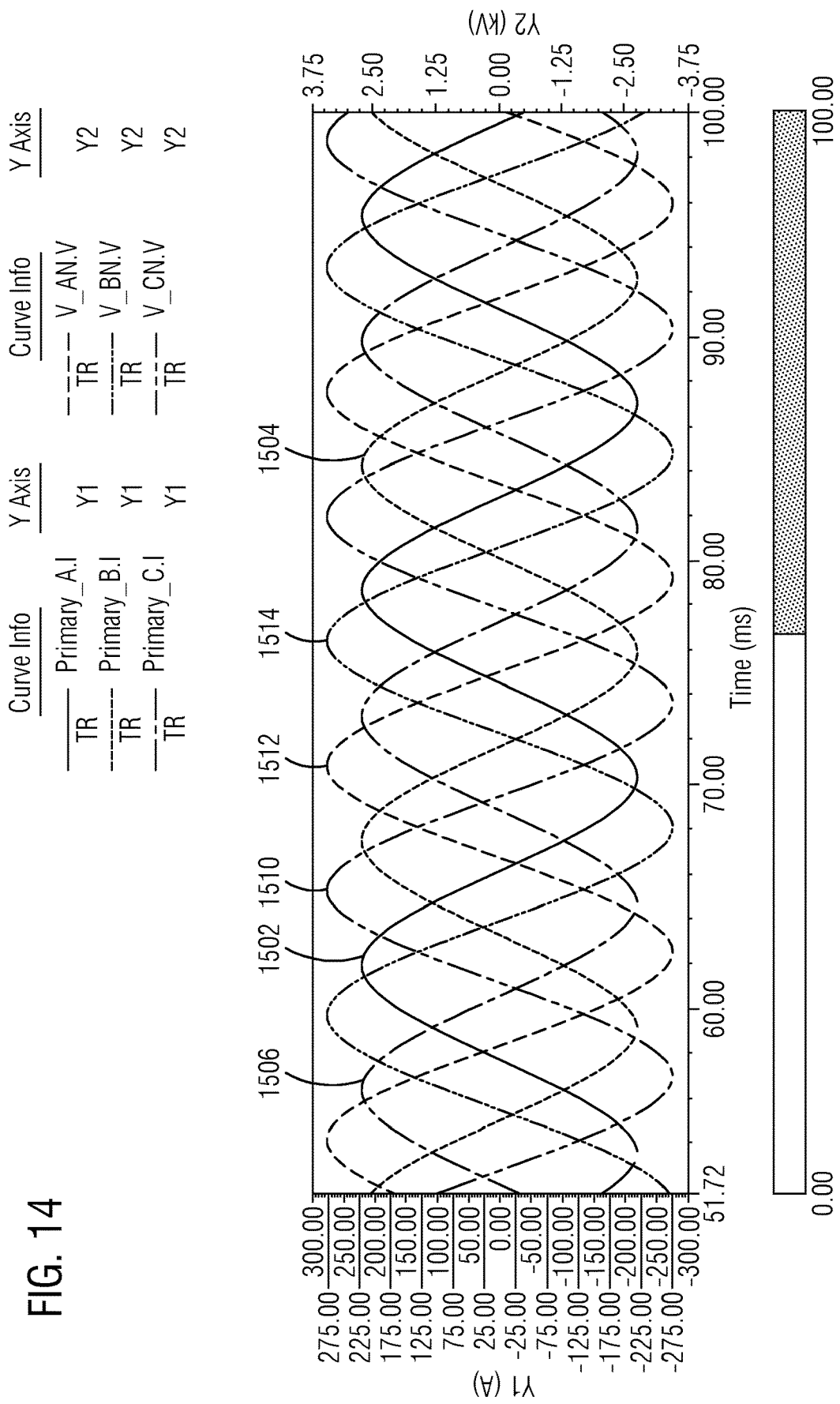
FIG. 14 illustrates a graphical representation of a simulation of primary input currents of multiple RCs during regeneration and with advance angle, where the RCs are modeled as current sources, in accordance with an exemplary embodiment of the present disclosure.

FIG. 14 illustrates a graphical representation of a simulation of primary input currents of multiple RCs during regeneration and with advance angle, in accordance with an exemplary embodiment of the present disclosure.

Specifically, FIG. 14 illustrates input currents 1502, 1504 and 1506 and input voltages 1510, 1512, 1514 for each phase of a 3-phase drive system. In this example, all RCs are modelled as DC current sources, and are at full load in regeneration mode.

Figure 15:
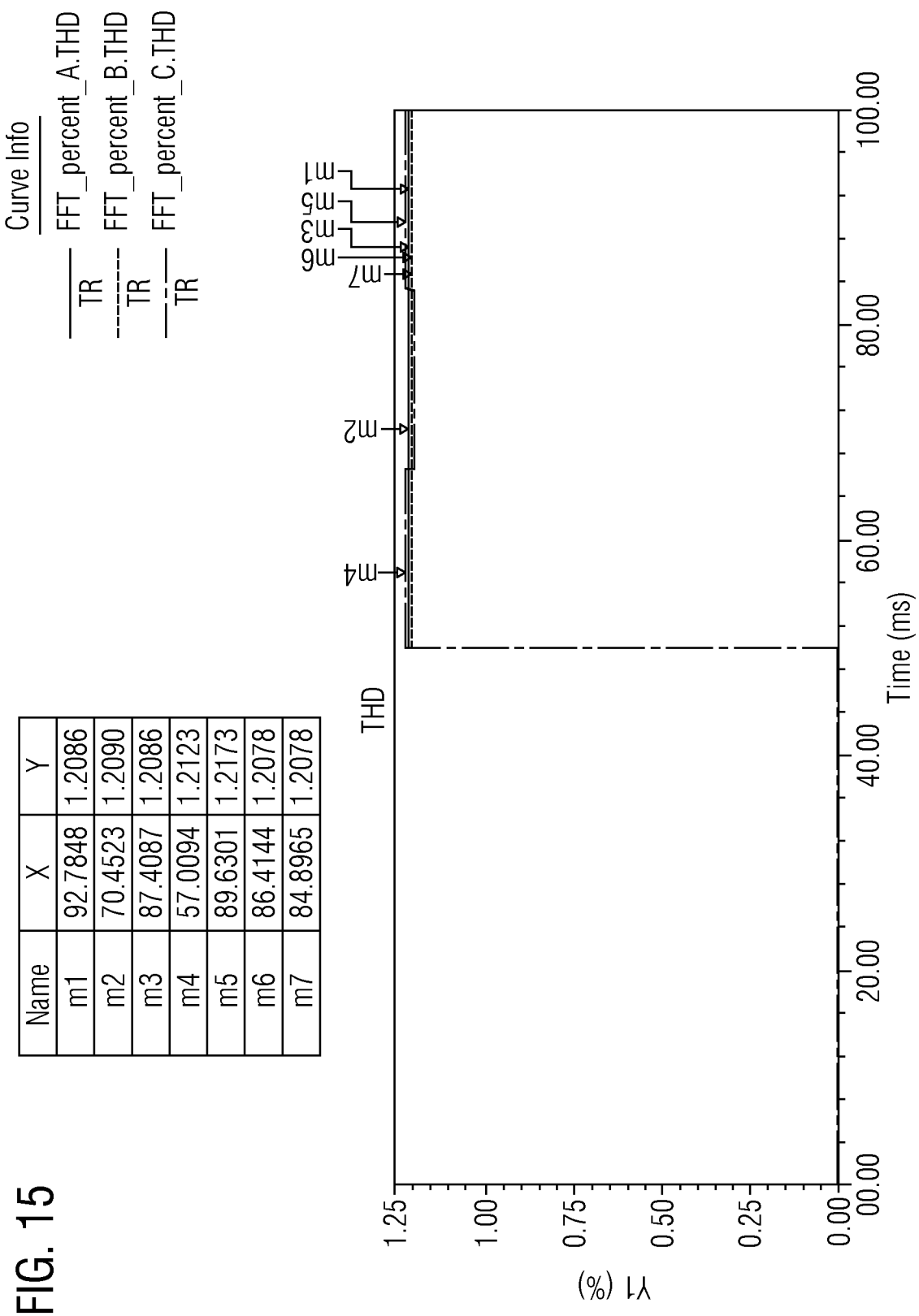
FIG. 15 illustrates THD for the primary input currents shown in FIG. 14 in accordance with an exemplary embodiment of the present disclosure.

FIG. 15 illustrates THD for the primary input currents shown in FIG. 14 in accordance with an exemplary embodiment of the present disclosure. As FIG. 15 shows, the THD of the primary input currents is around 1.2% at full load in regeneration mode.

Figure 16:
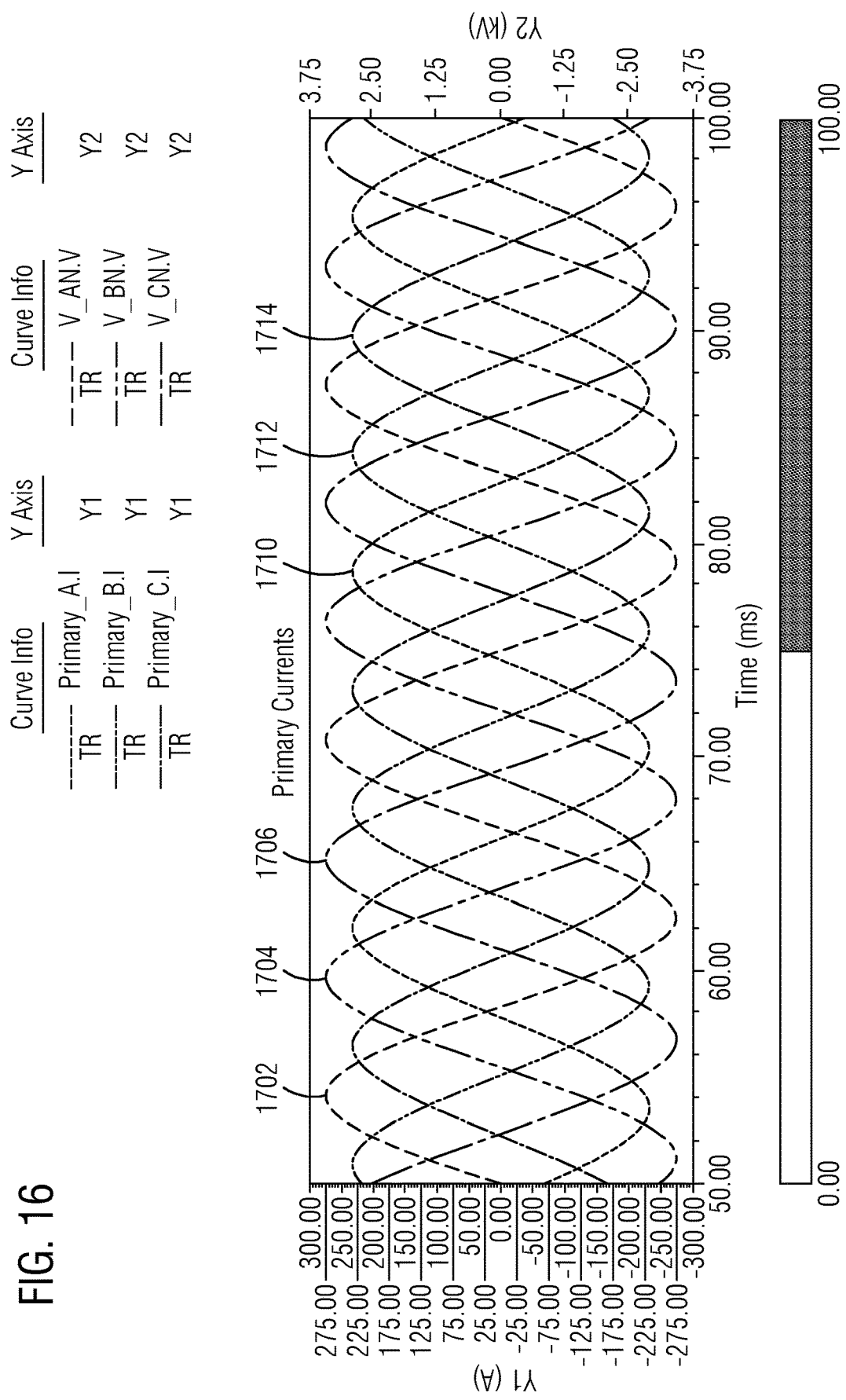
FIG. 16 illustrates a graphical representation of input currents and voltage of RCs during operation in a drive system.
Figure 17:
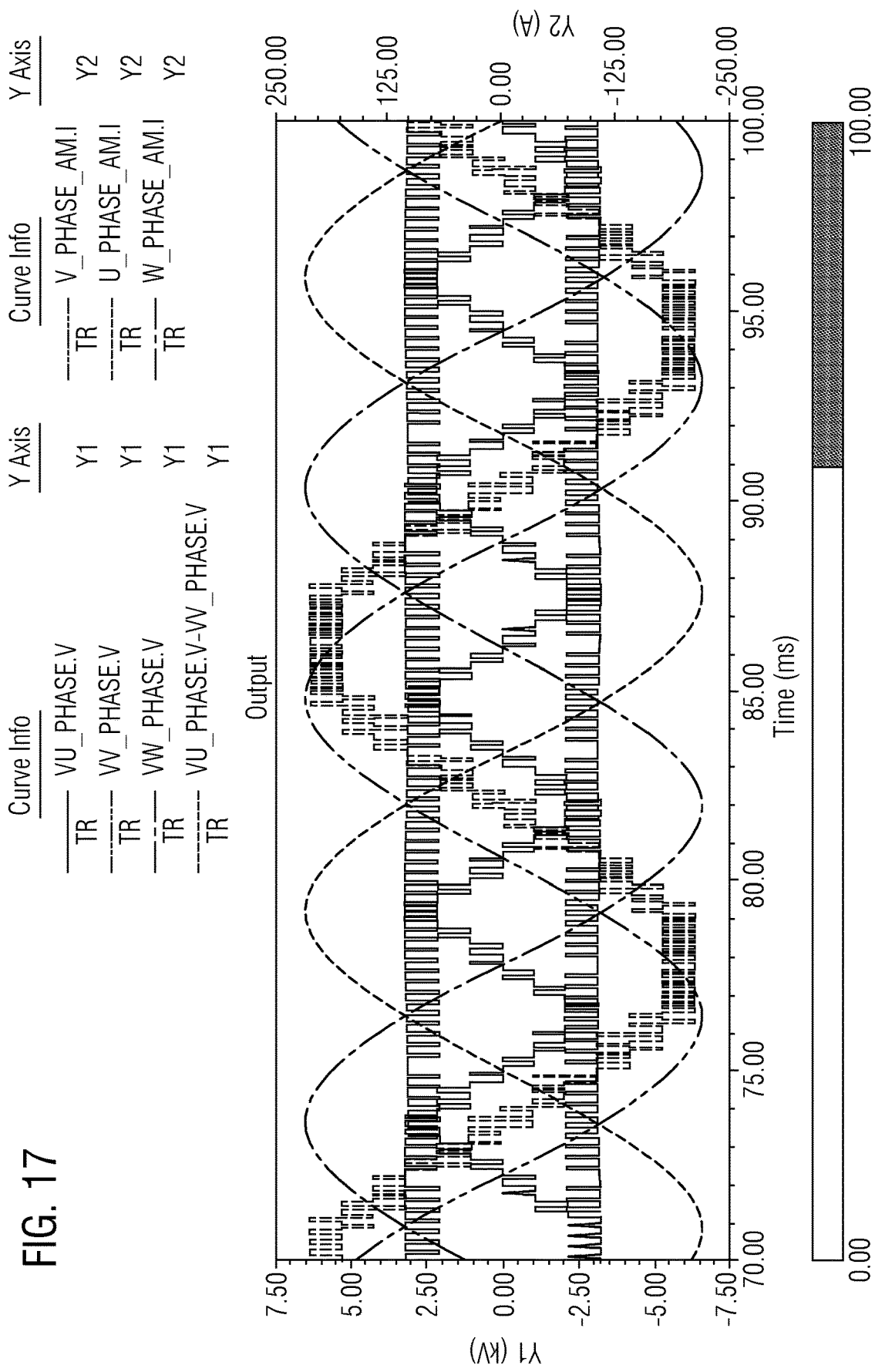
FIG. 17 illustrates output currents and voltage of the drive system, in accordance with exemplary embodiments of the present disclosure.

FIG. 16 illustrates a graphical representation of input currents and voltage of RCs during operation in a drive system, and FIG. 17 illustrates output currents and voltage of the RCs during operation in the drive system, in accordance with exemplary embodiments of the present disclosure.

With respect to FIG. 16 and FIG. 17, nine RCs of a drive system are operated at maximum modulation index, with the third harmonic injection added and all phase-shifting applied to each of the nine RCs. In an example, the RCs are operated at an output current of 154 amperes [A] and an output frequency of 60 hertz [Hz], with a rated capacity of 1250 [kVA] of the drive system. FIG. 16 shows input currents 1702, 1704, 1706 and voltage 1710, 1712, 1714.

Figure 18:
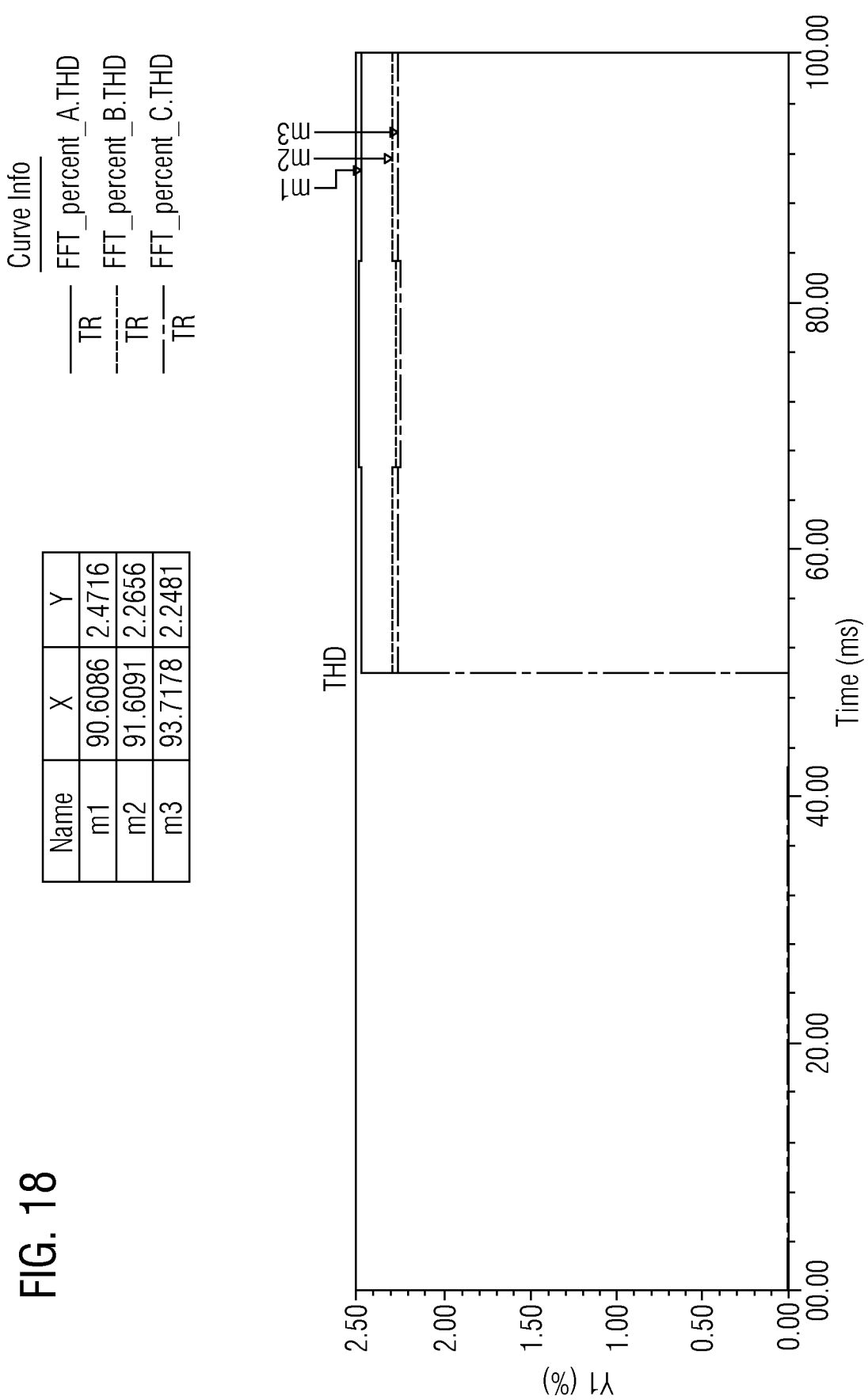
FIG. 18 illustrates THD of the input currents at full load in regeneration mode as illustrated in FIG. 16 in accordance with an exemplary embodiment of the present disclosure.

FIG. 18 illustrates THD of the input currents at full load in regeneration mode as illustrated in FIG. 16 in accordance with an exemplary embodiment of the present disclosure.

The THD of the input currents is approximately 2.5%. The THD of FIG. 18 is greater than the THD of FIG. 15, which is expected because the ideal current source has been replaced by an actual RC in operation. The strong effect of the second harmonic present in the DC-link current of the input IGBT bridge leads to the performance decrease in terms of the THD.

The regenerative drive system and methods for controlling the regenerative drive system as described herein can be operated in motoring mode as well as regeneration mode with THD less than 5% and thus meet the IEEE-519 standard and corresponding limits. The control methods can be used as an online method, where the drive system may comprise input current sensors to determine inductances $L_S$ of the RCs during an initialization phase, or offline, where values of the inductances $L_S$ can be entered as parameters of the central control system. Once the parameter(s) are known for each RC, formulas (5), (6) and (7) are used to determine an exact angle advance for the active front-end switching devices (IGBT's).

It should be appreciated that acts associated with the described methods for controlling a regenerative drive system and for determining conduction angles, features, and functions (other than any described manual acts) may be carried out by one or more data processing systems, such as for example central control system 18 (see FIG. 1), via operation of at least one processor. As used herein a processor corresponds to any electronic device that is configured via hardware circuits, software, and/or firmware to process data. For example, processors described herein may correspond to one or more (or a combination) of a microprocessor, CPU, or any other integrated circuit (IC) or other type of circuit that is capable of processing data in a data processing system. As discussed previously, the processor that is described or claimed as being configured to carry out a particular described/claimed process or function may correspond to a CPU that executes computer/processor executable instructions stored in a memory in form of software and/or firmware to carry out such a described/claimed process or function. However, it should also be appreciated that such a processor may correspond to an IC that is hard wired with processing circuitry (e.g., an FPGA or ASIC IC) to carry out such a described/claimed process or function.

In addition, it should also be understood that a processor that is described or claimed as being configured to carry out a particular described/claimed process or function may correspond to the combination of the processor with the executable instructions (e.g., software/firmware apps) loaded/installed into a memory (volatile and/or non-volatile), which are currently being executed and/or are available to be executed by the processor to cause the processor to carry out the described/claimed process or function. Thus, a processor that is powered off or is executing other software, but has the described software installed on a data store in operative connection therewith (such as on a hard drive or SSD) in a manner that is setup to be executed by the processor (when started by a user, hardware and/or other software), may also correspond to the described/claimed processor that is configured to carry out the particular processes and functions described/claimed herein.

In addition, it should be understood, that reference to "a processor" may include multiple physical processors or cores that are configures to carry out the functions described herein. Further, it should be appreciated that a data processing system may also be referred to as a controller that is operative to control at least one operation.

It is also important to note that while the disclosure includes a description in the context of a fully functional system and/or a series of acts, those skilled in the art will appreciate that at least portions of the mechanism of the present disclosure and/or described acts are capable of being distributed in the form of computer/processor executable instructions (e.g., software and/or firmware instructions) contained within a data store that corresponds to a non-transitory machine-usable, computer-usable, or computer-readable medium in any of a variety of forms. The computer/processor executable instructions may include a routine, a sub-routine, programs, applications, modules, libraries, and/or the like. Further, it should be appreciated that computer/processor executable instructions may correspond to and/or may be generated from source code, byte code, runtime code, machine code, assembly language, Java, JavaScript, Python, Julia, C, C #, C++ or any other form of code that can be programmed/configured to cause at least one processor to carry out the acts and features described herein. Still further, results of the described/claimed processes or functions may be stored in a computer-readable medium, displayed on a display device, and/or the like.

The invention claimed is:

1. A three-phase regenerative drive system comprising:
a plurality of power cells receiving power from a source and supplying power to one or more output phases, wherein each power cell is operable in a first operation mode comprising a motoring mode supplying power to output phases of a load and a second operation mode comprising a regeneration mode absorbing power from the load, the method, each power cell comprising multiple switching devices including active transistor-based front-end switching devices, and
a central control system controlling configured to control the transistor-based active front-end switching devices of each power cell with fixed nominal conduction angles in the first operating mode,
advance the conduction angles for the transistors in the second operation mode by greater than 0 (zero) degrees in addition to the nominal conduction angles based on output current and impedance of respective ones of the power cells, and
control the active front-end switching devices of the plurality of power cells with the advanced conduction angles during the second operation mode, thereby forcing simultaneous conduction of two transistors in an upper side or of two transistors in a lower side of the regenerative drive system.

2. The regenerative drive system of claim 1, wherein the control system is configured to operate the active front-end switching devices with the advanced conduction angles in the second operating mode such that a Total Harmonic Distortion (THD) is reduced to less than 5%, thereby operating the drive system in accordance with IEEE-519 standard with respect to input current distortion.

3. The regenerative drive system of claim 1, wherein the control system is configured to vary the conduction angles of the active front-end switching devices in the second operation mode based on output current and impedance of each of the respective power cell cells.

4. The regenerative drive system of claim 3, further comprising input current sensors for the plurality of power cells, and wherein the central control system is configured to determine the impedance of each power cell based on measurements of the input current of each power cell provided by the input current sensors.

5. The regenerative drive system of claim 3, wherein the impedance of each power cell is determined prior to operation of the drive system and entered as parameters of the central control system.

6. The regenerative drive system of claim 1, wherein the active front-end switching devices comprise insulated gate bipolar transistors (IGBTs).

7. A method for controlling a three-phase regenerative drive system operable in a first operation mode comprising a motoring mode supplying power to a load and a second operation mode comprising a regeneration mode absorbing power from the load, the method comprising:
setting fixed nominal conduction angles for transistors of active front-end switching devices of a plurality of power cells of the drive system in the first operation mode,
advancing the conduction angles for the transistors in the second operation mode by greater than 0 (zero) degrees in addition to the nominal conduction angles based on output current and impedance of respective ones of the power cells, and
controlling the active front-end switching devices of the plurality of power cells with the advanced conduction angles during the second operation mode, thereby forcing simultaneous conduction of two transistors in an upper side or of two transistors in a lower side of the regenerative drive system.

8. The method of claim 7, wherein determining the conduction angles the transistors in the of the active front-end switching devices in the second operation mode comprises calculating the conduction angles based on output current and impedance of each of the respective power cells.

9. The method of claim 8, wherein the conduction angles are calculated in real time during operation of the power cells.

10. The method of claim 8, wherein the conduction angles are calculated prior to operation of the power cells.

11. The method of claim 7, further comprising:
measuring input current, by input current sensors, of each power cell and determining the impedance based on the measured input current for each power cell.

12. The method of claim 7, wherein controlling the active front-end switching devices of the plurality of power cells with the advanced conduction angles in the second operating mode reduces a Total Harmonic Distortion (THD) of the drive system to less than 5%, thereby operating the drive system in accordance with IEEE-519 guideline with respect to input current distortion.

13. A non-transitory computer readable medium encoded with processor executable instructions that when executed by at least one processor, cause the at least one processor to carry out a method for controlling a regenerative drive system as claimed in claim 7.

* * * * *